United States Patent [19]

Isshiki

[11] Patent Number: 4,719,520
[45] Date of Patent: Jan. 12, 1988

[54] METHOD AND APPARATUS FOR SETTING RECORDING CURRENT IN PERPENDICULAR MAGNETIC RECORDING APPARATUS

[75] Inventor: Masanori Isshiki, Yokohama, Japan

[73] Assignee: Kabushiki Kaisha Toshiba, Kawasaki, Japan

[21] Appl. No.: 721,890

[22] Filed: Apr. 11, 1985

[30] Foreign Application Priority Data

May 10, 1984 [JP] Japan .................................. 59-93188

[51] Int. Cl.$^4$ ........................ H04N 9/79; H04N 9/83; G11B 5/03
[52] U.S. Cl. ...................................... 360/20; 360/24; 360/25; 360/66; 358/315; 358/330
[58] Field of Search .................... 360/20, 19.1, 24, 25, 360/66, 55; 358/310, 315, 316, 318, 330; 427/48

[56] References Cited

U.S. PATENT DOCUMENTS

| | | |
|---|---|---|
| 2,419,195 | 6/1944 | Begun . |
| 4,353,100 | 10/1982 | Inoue ................................ 360/66 X |
| 4,379,311 | 4/1983 | Ohkawara ............................. 360/66 |
| 4,380,779 | 4/1983 | Kitamura et al. ................. 360/66 X |
| 4,422,109 | 12/1983 | Sampei et al. ..................... 360/66 X |
| 4,447,467 | 5/1984 | Oguchi et al. ......................... 427/48 |

FOREIGN PATENT DOCUMENTS 0105502  4/1984  European Pat. Off. .
944864  12/1963  United Kingdom .

Primary Examiner—Aristotelis M. Psitos
Assistant Examiner—Wayne R. Young
Attorney, Agent, or Firm—Cushman, Darby & Cushman

[57] ABSTRACT

A method for superimposed recording of a first signal and a second signal with frequency which is less than the frequency for the first signal, in a perpendicular magnetic recording medium by means of a ring-shaped magnetic head. The mutually superimposed first and second signals are supplied to the magnetic head. The value of the first signal current to be supplied to the magnetic head is set at a value which is greater than the current value for which the reproduced output level of the first signal that was recorded on the magnetic recording medium attains a maximum, and a satisfactory superimposed recording characteristic can be obtained by such an arrangement.

20 Claims, 8 Drawing Figures

METHOD AND APPARATUS FOR SETTING RECORDING CURRENT IN PERPENDICULAR MAGNETIC RECORDING APPARATUS

BACKGROUND OF THE INVENTION

The present invention relates to a perpendicular magnetic recording method and apparatus, more particularly to a method and apparatus for superimposing a plurality of signals with different frequencies on a perpendicular magnetic recording medium.

In what is known as a perpendicular magnetic recording technique, signals are recorded on a magnetic recording medium with an axis of easy magnetization in the direction perpendicular to the magnetic surface. This is accomplished by magnetizing the medium in the direction perpendicular to its magnetic surface. This technique has been attracting attention for its high density recording possibilities. This perpendicular magnetic recording technique may be applied to a variety of recording devices such as video apparatus, audio apparatus, memories for electronic computers, and so forth. Generally, with this technique, one signal will be recorded on one recording track.

With the more conventional longitudinal recording method, depending upon the purpose of its use, a plurality of signals with different frequencies may be superimposed on one recording track. For instance, in home use video cassette recorders, the low frequency conversion chrominance signal is recorded simultaneously supeimposed on the low frequency carrier FM luminance signal, the frequency of which is higher than that of the low frequency conversion chrominance, using the same recording head. It is important in a superimposed recording of this kind that the recording is made by supplying the magnetic head with a previously determined optimum recording current so as to be able to reproduce sufficiently strong outputs for each of the superimposed signals during reproducing. In particular, in a superimposed recording, an important problem is how to select the recording current of the high frequency signal for the high frequency bias.

Such a superimposed recording has so far been accomplished for the longitudinal magnetic recording method alone. In the superimposed recording of the longitudinal magnetic recording method, it has been known that the values of the reproduced outputs of the high and low frequency signals are maximized with approximately the same recording current for the high frequency signal. Therefore, in the longitudinal recording method, a satisfactory superimposed recording characteristic can be obtained by first selecting the recording current for the high frequency signal which gives rise to a maximum reproduced output of the high frequency signal, and then by determining the recording current for the low frequency signal so as to have a reproduced output level of the low frequency signal which is nearly equal to the reproduced output level of the high frequency signal.

However, by carrying out a superimposed recording for the perpendicular recording method by selecting the recording currents for the high frequency signal and the low frequency signal by a method similar to the longitudinal recording method, it was found that a satisfactory superimposed recording characteristic was not obtainable due to large distortion levels, the impossibility of obtaining a sufficiently large output level of the reproduced signal, and so forth.

SUMMARY OF THE INVENTION

An object of the present invention is to provide a perpendicular magnetic recording method and apparatus which is optimally adapted for a superimposed recording of signals with more than two frequencies in a perpendicular magnetic recording medium, by means of a ring-shaped recording head.

Another object of the present invention is to provide a perpendicular magnetic recording method and apparatus which has a satisfactory signal-to-noise ratio and a smaller chance of having a dropout.

According to a preferred embodiment of the present invention, recording is accomplished on a perpendicular magnetic recording medium with an axis of easy magnetization in the direction perpendicular to its magnetic surface. A current for the high frequency signal superimposed on a current for the low frequency signals is supplied to a ring-shaped magnetic head. The current for the high frequency signal is set to a value greater than the value that would produce a maximum reproduced output of the high frequency signal. If the level of the reproduced output of the high frequency signal shows a constant maximum over a certain range of the high frequency recording signal current, the current of the high frequency signal which maximizes the reproduced output level of the high frequency signal is defined as that value of the current at which the reproduced output level of the high frequency signal reaches the maximum value for the first time. The recording current value of the low frequency signal may be set at a value for which the reproduced output level of the two signals are about the same.

In this manner, the present invention gives a larger reproduced output of the low frequency signal compared with the case in which the current is set to be equal to the current value for which a maximum value in the level of reproduced output of the high frequency signal is attained. In addition, even though the reproduced output of the high frequency signal is lowered from its maximum, the amount that it needs to be lowered is, in fact, very small so that the SN ratio remains high. Moreover, the improvement in the SN ratio here is accomplished without accompanying increases in the levels of the various distortions such as harmonic distortion and cross modulation distortion.

Furthermore, since the current of the high frequency signal which acts also as a high frequency bias current is set in this case at a relatively large value, a perpendicular magnetic recording penetrating deep into the recording layer can be accomplished so that dropouts are reduced.

BRIEF DESCRIPTION OF THE DRAWINGS

These and other objects and advantages of this invention will become more apparent and more readily appreciated from the following detailed description of the presently preferred exemplary embodiments of the invention taken in conjunction with the accompanying drawings in which.

DETAILED DESCRIPTION OF THE PREFERRED EMBODIMENTS

Figure 1:
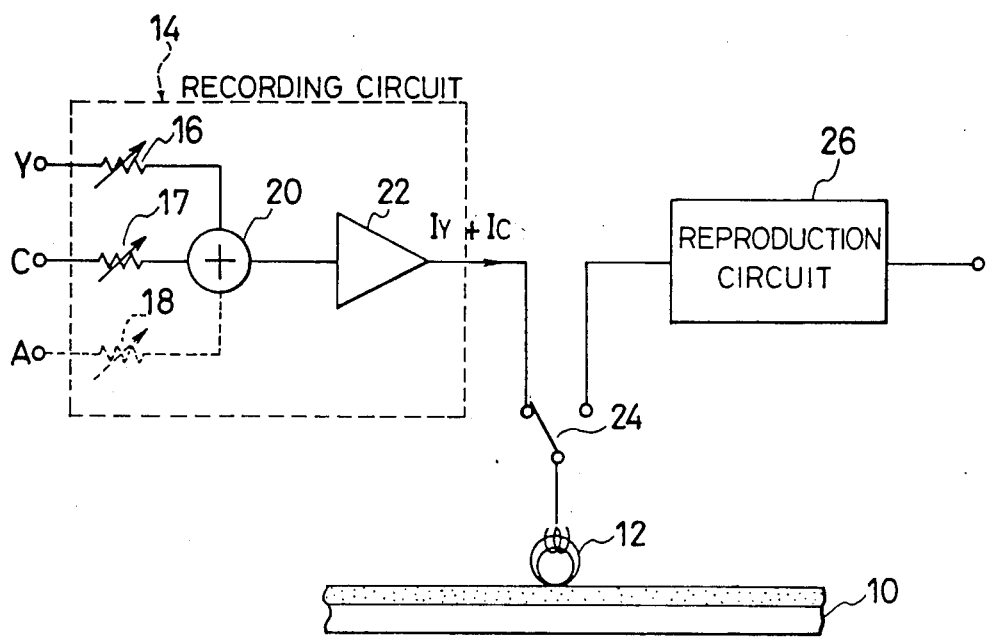
FIG. 1 is a block diagram of recording and reproducing circuitry for carrying out perpendicular magnetic recording according to the present invention.
Figure 2:
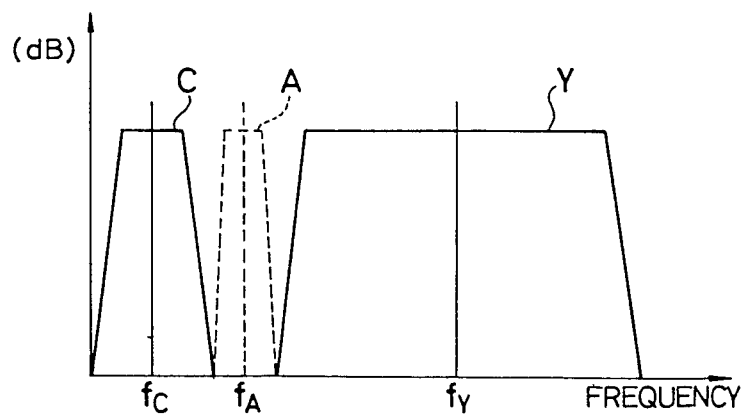
FIG. 2 illustrates the frequency allocation for the superimposed recording signals in the circuitry shown in FIG. 1.

Referring now to FIG. 1, a perpendicular magnetic recording medium 10 is a particulate medium obtained by coating magnetic particles of, for example, barium ferrite. Recording and reproducing are carried out with a ring-shaped magnetic head 12. For recording, a plurality of different kinds of signals such as those shown in FIG. 2, namely, a low frequency carrier FM luminance signal (called the Y signal hereafter) which is a higher frequency signal and a low frequency conversion chrominance signal (called the C signal hereafter) which is a lower frequency signal are supplied to a recording circuit 14. Depending upon the circumstance, in addition there may be supplied to the recording circuit 14 an FM sound signal, shown as the curve A in FIG. 2, which is inserted between the Y and C signals as another low frequency signal, as may be found in the case of Hi-Fi VTR. After currents are controlled by variable resistances 16, 17 and 18 in recording circuit 14, these signals are supplied to an adder 20 to be summed. The current of the output signal of adder 20 is amplified by an amplifier 22, and is supplied to magnetic head 12 through a change-over switch 24 for recording/reproducing. In this way, the Y signal and the C signal, and perhaps the FM sound signal are recorded superimposed on the perpendicular magnetic recording medium. In this situation the Y signal acts as a high frequency bias signal.

The signal recorded on perpendicular magnetic recording medium 10 is reproduced by magnetic head 12, and is taken out as a reproduced output through change-over switch 24 and a reproducing circuit 26.

Figure 3B:
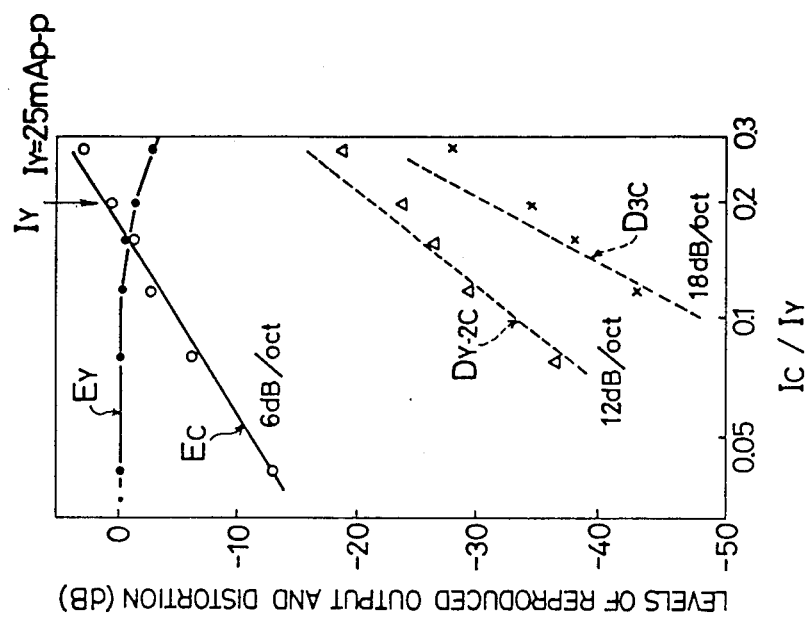
FIGS. 3A and 3B show, in the case of superimposed recording a low frequency carrier FM luminance signal and a low frequency conversion chrominance signal according to the prior art longitudinal recording method, the dependency characteristic on the Y signal recording current and the dependency characteristic on the C signal, respectively, of the reproduced output signals and the distortion levels.
Figure 3A:
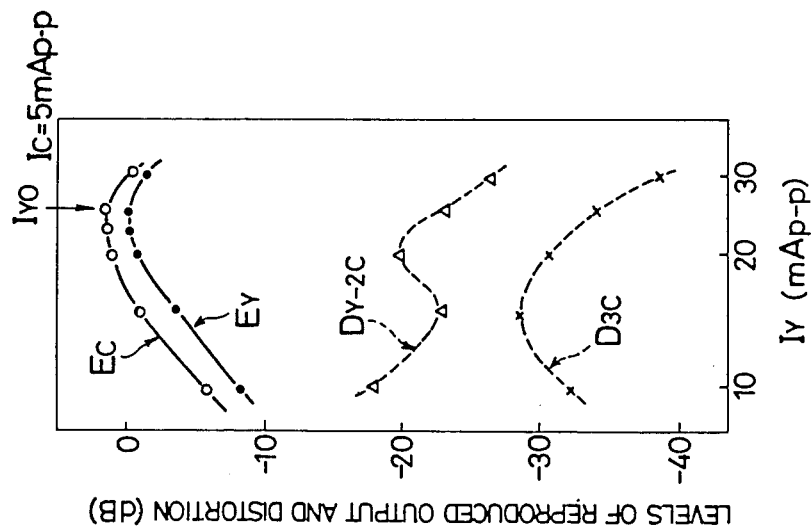

FIGS. 3A and 3B show the results of measurements taken on the superimposed recording of the Y signal and the C signal, by the use of a longitudinal magnetic recording medium with an axis of easy magnetization in the plane of the magnetic layer. Apparatus similar to that of FIG. 1 may be employed for such recording if resistances 16, 17 and 18 are adjusted appropriately. The conditions of the measurements are as follows.

| | |
|---|---|
| Magnetic recording medium | Metal particulate tape Coercive force Hc = 1350 Oe |
| Magnetic head | Ring-shaped metal core head |
| | Gaplength g = 0.3 m Track width w = 22 m Turn coil n = 18 T |
| Recording medium - to magnetic-head relative speed | V - 3.75 m/sec |
| Frequency of the Y signal $f_Y$ | $f_Y$ = 5 MHz |
| Frequency of the C signal $f_C$ | $f_C$ = 750 kHz |

In FIG. 3A, the recording was accomplished by varying the Y signal recording current $I_Y$ to be supplied to magnetic head 12, through variations of variable resistance 16, where the C signal recording current $I_C$ to be supplied to the magnetic head 12 is fixed at a constant value of $I_C=5$ mA$_{p-p}$. The figure shows the characteristics of the reproduced output level $E_Y$ of the Y signal, the reproduced output level $E_C$ of the C signal, the cross modulation distortion level $D_{Y-2C}$ that occurs at the frequency $f_y-2f_C$ (=3.5 MHz), and the third harmonic distortion level $D_{3C}$ which occurs at the frequency $3f_C$ (=2.25 MHz). It has been known in superimposed recording that the cross modulation distortion and the third harmonic distortion occur respectively at the frequencies mentioned above. From the figure, it can be seen that the maxima of the reproduced output level $E_Y$ and $E_C$ occur approximately at the optimum recording current value $I_{Yo}$ (=25 mA$_{p-p}$) of the Y signal.

The characteristics of $E_Y$, $E_C$, $D_{Y-2C}$, and $D_{3C}$ obtained by fixing the recording current of the Y signal at a value $I_{Yo}$ (=25 mA$_{p-p}$), and by varying the recording current $I_C$ of the C signal by means of the variable resistance 17 are shown in FIG. 3B. From the figure, it can be seen that the lowering of the reproduced output level $E_Y$ of the Y signal is relatively small when the ratio $I_C/I_Y$ is about 0.2, that is, when $I_C=5$ mA$_{p-p}$, and that the reproduced output level $E_C$ of the C signal which is nearly equal to the reproduced output level $E_Y$ of the Y signal can be obtained for that value of the $I_C$. Further, the cross modulation distortion level $D_{Y-2C}$ is small at a balue which is below −20 dB compared with $E_Y$, lying in a nearly negligible range, so that it is possible to obtain a satisfactory superimposed recording performance. A common characteristic of the longitudinal magnetic recording method is that it gives rise to a superimposed recording characteristic in which the maximum values of the reproduced output level for both of the high frequency signal and the low frequency signal are attainable for a certain value of the high frequency signal recording current. Therefore, it is possible to obtain a large reproduced output level for both of the high frequency signal and the low frequency signal, by first selecting a value of the high frequency signal recording current for which the reproduced output level of the high frequency signal shows a maximum, and then by selecting the value of the low frequency signal recording current so as to have the reproduced output level of the low frequency signal to be comparable to the reproduced output level of the high frequency signal.

Figure 4B:
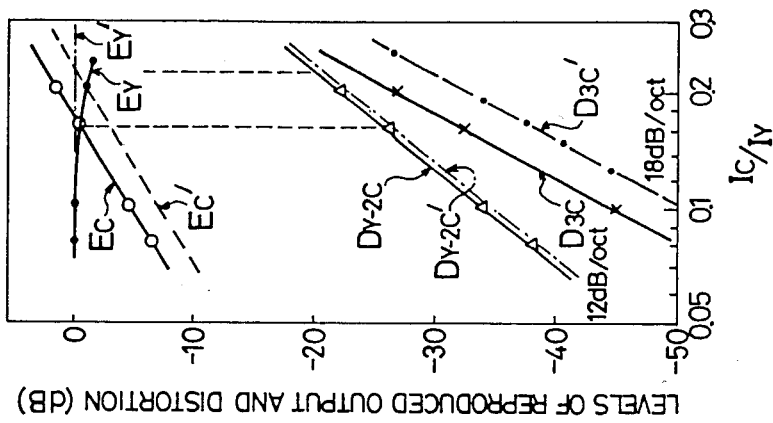
FIGS. 4A and 4B show, in the case of superimposed recording of the Y signal and the C signal due to the perpendicular magnetic recording method in accordance with the present invention, the dependency characteristic on the Y signal recording current and the dependency characteristic on the C signal, respectively, of the reproduced output levels and the distortion levels.
Figure 4A:
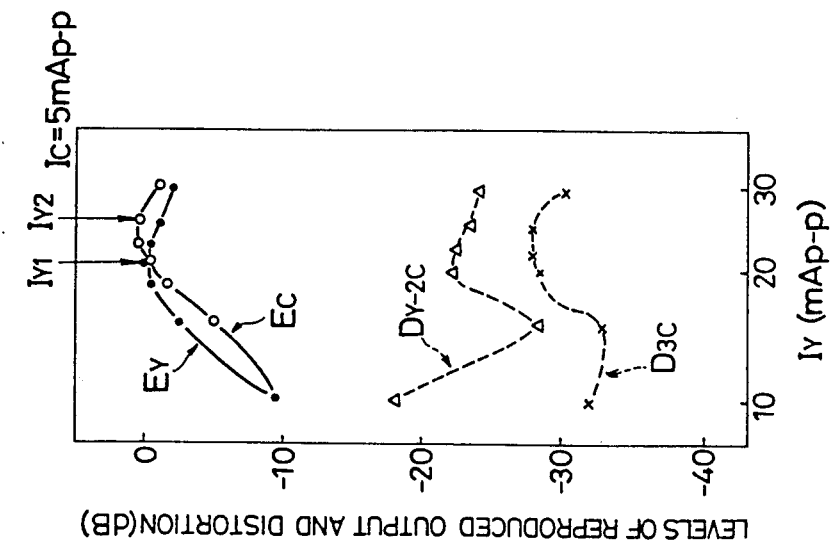

FIGS. 4A and 4B show the superimposed recording characteristics of the perpendicular magnetic recording method which is the object of the present invention. In particular, the reproduced output and distortion versus the Y signal recording current characteristics are shown for the case in which the superimposed recording is carried out for a particulate perpendicular magnetic recording medium with a ring-shaped magnetic head. For these measurements, use was made, as a perpendicular magnetic recording medium of a tape (called the barium ferrite particulate perpendicular magnetic tape hereafter) obtained by coating the particles of a hexagonal platelet ferrite crystal (here they were the particles of a $C_o$-$T_i$ substituted barium ferrite) with an axis of easy magnetization in the direction of C axis which is perpendicular to the surface of the hexagonal plate, so as to have the axis of easy magnetization oriented in the direction perpendicular to the medium surface. Using a ring-shaped magnetic head the same as that used for the case of FIGS. 3A and 3B, measurements were taken for the case of superimposed recording of the Y signal and the C signal. Here, the barium ferrite perpendicular magnetic tape used for the measurements had a perpendicular squareness ratio, or a degree of perpendicular orientation, SQR (perpendicular rectangular ratio), which was compensated by the demagnetizing field $4\pi M$ (M: magnetization) determined from the magnetization curve obtained for the thickness direction of the tape, of SQR=$\pi 0.54$, and a perpendicular coercive force Hc of Hc=930 Oe. Similar to FIGS. 3A and 3B, FIG. 4A shows the dependency characteristic on the Y signal recording current $I_Y$, and FIG. 4B shows the dependency characteristic on the C signal recording current $I_C$. Other measurement conditions were set the same as for FIGS. 3A and 3B.

In the characteristics for a longitudinally oriented tape shown in FIGS. 3A and 3B, the values of the Y signal recording current that give rise to a maximum of the Y signal reproduced output level and a maximum of the C signal reproduced output level were approximately equal.

In contrast to this, it will be seen from FIG. 4A that the maximum for the C signal reproduced output level $E_C$ takes place for a Y signal recording current value $I_{Y2}$ which is larger than the current value $I_{Y1}$, for which the Y signal reproduced output level $E_Y$ attains its maximum by an amount corresponding to an increase of 1 to 3 dB. This is a characteristic phenomenon which occurs when a superimposed recording is carried out in a perpendicular magnetic recording medium by the use of a ring-shaped magnetic head, which was discovered for the first time in this invention.

The recording method in accordance with the present invention has a characteristic feature in that, based on the above experimental results, the superimposed recording is to be carried out by setting the recording current value of the Y signal at a value larger, preferably by an amount corresponding to an increase in current of from 1 to 3 dB, than the current value $I_{Y1}$ for which the reproduced output level $E_Y$ of the Y signal attains a maximum. When set in this manner, the reproduced output level $E_Y$ of the Y signal will be decreased by about 0.5 to 1 dB. However, a reduction in this range hardly causes any difficulty. In particular, in the case of using a perpendicular magnetic recording medium with a large degree of perpendicular orientation that will be described later, the recording demagnetization becomes even smaller, giving rise to a tendency to restrain the lowering of $E_Y$, so that the problem will become much less of a concern. The recording current for the low frequency signal should be set so that the reproduced output levels of the two signals is about the same while attempting to minimize distortion.

The advantages of the recording method in accordance with the present invention will become apparent by referring to FIG. 4B. Compared in FIG. 4B are the reproduced output levels $E_Y$ and $E_C$, and the distortion levels $D_{Y-2C}$ and $D_{3C}$ for the case in which the current value $I_Y$ of the Y signal recording is set at $I_{Y2}$ and the current $I_C$ of the C signal recording is varied.

As is clear from the figure, when the current value $I_Y$ of the Y signal recording is set at $I_{Y2}$, $E_Y$ and $E_C$ have approximately equal levels at about 0.16 of the ratio $I_C/I_Y$, with sufficiently small values for the harmonic distortion level $D_{3C}$ and the cross modulation distortion level $D_{Y-2C}$, so that a satisfactory superimposed recording can be obtained. In contrast, when the current value $I_Y$ of the Y signal recording is set, as is conventionally done, at $I_{Y1}$ where the reproduced level of the Y signal attains a maximum, and the reproduced level of the C signal is about the same, $E_Y'$ and $E_C'$ become approximately equal at about the value of 0.22 for the ratio $I_C/I_Y$. However, the cross modulation distortion level $D_{Y-2C}'$ for that value becomes very large, deteriorating the characteristic for the superimposed recording. This is due to the circumstance that as the current $I_C$ for the C signal recording is increased, the reproduced level $E_C'$ of the C signal increases at a rate of 6 dB/oct, whereas the cross modulation distortion level $D_{Y-2C}'$ increase at a rate of 12 dB/oct.

In this manner, in carrying out a superimposed recording in a magnetic recording medium by means of a ring-shaped magnetic head, the following method based on the present invention will lead to good recording results. Namely, the current value for the Y signal, which is a high frequency signal, should be set at a current value $I_{Y2}$ which is greater than the value $I_{Y1}$ for which the reproduced output level $E_Y$ of the Y signal attains a maximum. The current value for the C signal may be set at a value to produce about the same reproduced output level as $E_Y$. With the currents set accordingly, the reproduced output level $E_C$ of the C signal which is a low frequency signal can be maintained at a sufficiently high level, with little lowering in the reproduced output level $E_Y$ of the Y signal. Also, the levels of the various kinds of distortion can be controlled at relatively small values, making it possible to obtain a satisfactory recording characteristic.

Furthermore, by setting $I_Y$ at a somewhat larger value, magnetization in the recording medium can penetrate to a deeper layer of the magnetic layer so that dropouts are decreased.

Figure 5B:
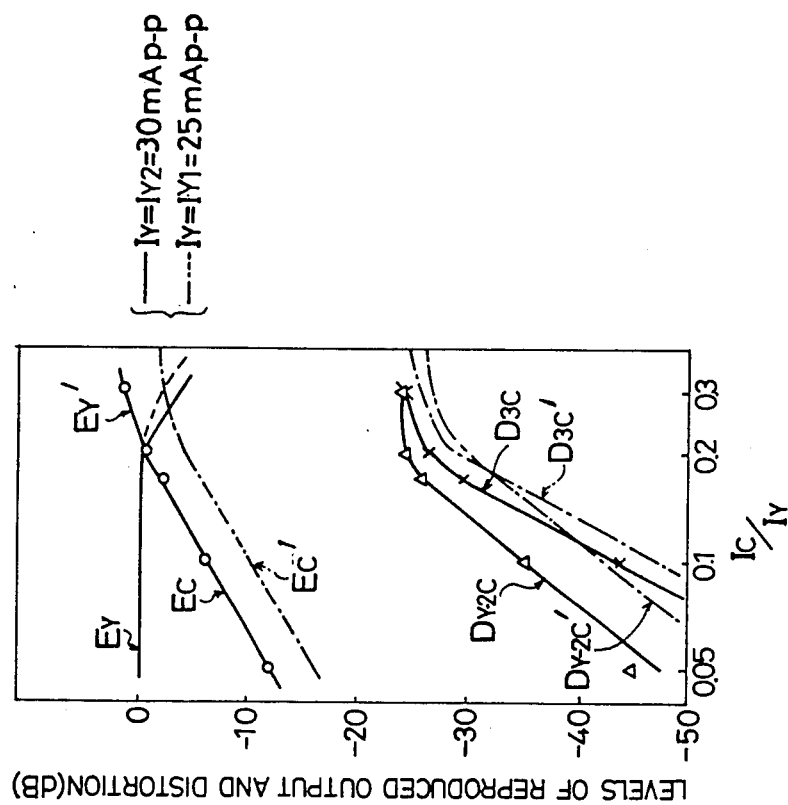
FIGS. 5A and 5B show the dependency characteristic on the Y signal recording current and the dependency characteristic on the C signal, respectively, of the reproduced output signals and the distortion levels for the case where a superimposed recording of the Y signal and the C signal is carried out due to the perpendicular magnetic recording method in accordance with the present invention, by the use of a perpendicular magnetic recording medium with a perpendicular squareness ratio which is different from that for FIGS. 4A and 4B.
Figure 5A:
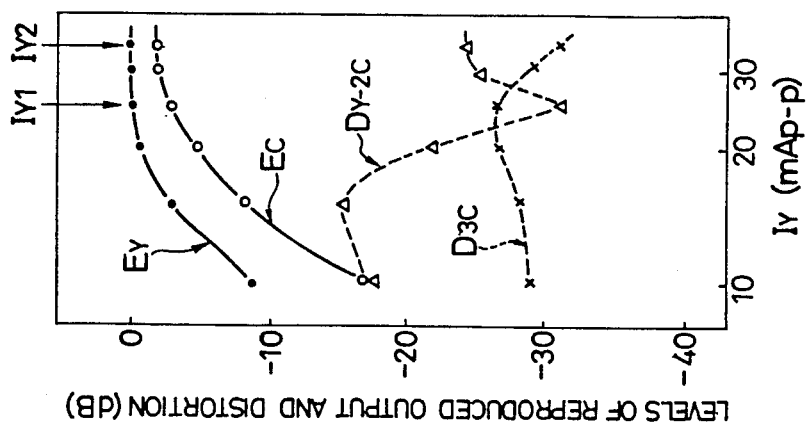

In FIGS. 4A and 4B, the results of measurements were shown for the case of a perpendicular magnetic recording medium (barium ferrite perpendicular magnetic tape) with perpendicular rectangular ratio of SQR=0.54. FIGS. 5A and 5B show an example with a larger value of the degree of perpendicular orientation using a barium ferrite perpendicular magnetic tape of SQR=0.92 ($H_C$=1350 Oe). Measurements were taken for the dependency characteristic on the Y signal recording current $I_Y$ and the dependency characteristic on the C signal current $I_C$, of the reproduced output levels and the distortion levels. The measurement conditions were the same as for the case of FIGS. 4A and 4B.

As may be seen from FIG. 5A, the current value $I_{Y2}$ of the Y signal recording at which the reproduced output level $E_C$ of the C signal attains a maximum is greater than the current value $I_{Y1}$ of the Y signal recording for which the reproduced output level $E_Y$ of the Y signal attains a maximum, by an amount corresponding to an increase of more than 1 dB. Therefore, by selecting the current value $I_Y$ of the Y signal recording at a value $I_{Y2}$ which is greater than the set value $I_{Y1}$, by an amount corresponding to an increase of more than 1 dB, a satisfactory superimposed recording characteristic can be obtained. Namely, as shown by FIG. 5B, in the case of selecting $I_Y=I_{Y2}$, it is possible, for the range of from 0.25 to 0.3 of the ratio $I_C/I_{Y2}$, to obtain sufficiently high reproduced signal levels $E_Y$ and $E_C$, while keeping the distortion levels of $D_{Y-2C}$ and $D_{3C}$ at negligibly small values. In particular, it will become possible to obtain a satisfactory picture signal since $E_C$ can be made large in this method. On the other hand, in the case of $I_Y=I_{Y1}$, although the levels of the distortions $D_{Y-2C}$ and $D_{3C}$ can be made small similar to the case of the present invention, the levels of the reproduced signals $E_Y'$ and $E_C'$ are lowered, resulting in a deterioration in the reproduced pictures. Further, it is appropriate to select the set value of $I_Y$ at a value which is larger than $I_{Y1}$, corresponding to an increase of the reproduced output level in the range of from 1 to 3 dB since the cross modulation distortion $D_{Y-2C}$ increases if $I_Y$ is made too large.

Furthermore, differing from the case of FIG. 4A, in FIG. 5A the reproduced output level $E_Y$ of the Y signal remains at a relatively constant level without coming down, even when the current value $I_Y$ of the Y signal recording is increased after attaining a maximum of $E_Y$. That is, it is possible to have the reproduced output level $E_C$ of the C signal at a maximum value, as well as keeping the reproduced output level $E_Y$ of the Y signal at a maximum value, realizing an advantage of the present method in an effective manner.

Although description has been given, in connection with the embodiments of the present invention, on the measurement results for the cases of magnetic recording medium with two kinds of perpendicular squareness ratio SQR, it is obvious that similar results can be obtained for a medium with perpendicular rectangular ratio SQR which is greater than 0.5, namely, for a perpendicular magnetic recording medium. Further, for the case of carrying out a superimposed recording in a perpendicular magnetic recording medium, a particulate medium with a thick magnetic layer and a gentle perpendicular orientation is better suited as a perpendicular magnetic recording medium for the present invention than a metallic film perpendicular magnetic recording medium with very good perpendicular orientation. As for the form of the medium, too, it need not be limited to the form of a tape, and may be found in sheet-form, disk-form, card-form, or the like. The magnetic particles to be used in forming a recording medium, too, are not limited to those of barium ferrite, but it will do if a medium is formed by spreading particles with axis of easy magnetization oriented in the perpendicular direction. In particular, judging from its shape, a hexagonal system ferrite crystal of hexagonal plate-shape is favorably suited, since it is easy to be oriented in the perpendicular direction. Further, of the hexagonal system ferrite crystals, effective for this purpose are the substitution-type hexagonal ferrite crystals in which a part of ferrites of Ba, Sr, Pb, Ca, and others is substitued by Co, Ti, Nb, Ta, Sb, and others.

Moreover, although the case of superimposed recording of two signals with different frequencies has been described in the preceding embodiments, it has been confirmed experimentally that a similar effect can be accomplished, in the case of superimposed recordings of more than two signals, by setting the current value of the signal with the highest frequency among them at a value greater than the current value for which the reproduced output level for that frequency attains its maximum.

While the present invention has been described in connection with what is presently considered to be the most practical and preferred embodiments, it is to be understood that the present invention is not to be limited to the disclosed embodiments but on the contrary, is intended to cover various modifications and equivalent arrangements included within the spirit and scope of the appended claims whose scope is to be accorded the broadest interpretation so as to encompass all such modifications and equivalent structures.

What is claimed is:

1. Perpendicular magnetic recording method for recording a first signal current and a second signal current having a frequency lower than that of the first signal current, comprising the steps of:

setting the recording level of said first signal current to be a level greater than the current level at which a reproduced output level of said first signal current is maximized, said maximum of said reproduced output level being determined by varying said first input current while holding said second input current constant;

setting the recording level of said second signal current to a level at which the reproduced output level of said second signal current is approximately equal to the reproduced output level of said first signal current;

superimposing said first and second signal currents;

supplying said superimposed currents to a magnetic head; and magnetizing a magnetic recording medium with said magnetic head supplied with said superimposed currents, said medium having an axis of easy magnetization perpendicular to its surface.

2. Perpendicular magnetic recording method according to claim 1 wherein the current level of said first signal current is set at a value which is from 1 to 3 dB larger than the current level at which the reproduced output level of said first signal current attains a maximum.

3. Perpendicular magnetic recording method according to claim 1 wherein said magnetizing step magnetizes a particulate perpendicular magnetic recording medium which is formed by coating magnetic powder on a substrate.

4. Perpendicular magnetic recording method according to claim 3 wherein said particulate perpendicular magnetic recording medium has a magnetic layer which is a hexagonal system ferrite crystal.

5. Perpendicular magnetic recording method according to claim 4 wherein said hexagonal system ferrite crystal is a barium ferrite of Co-Ti substitution type.

6. Perpendicular magnetic recording method according to claim 1, wherein the recording level of said second signal current is set at a level at which the reproduced output level of said second signal current is within ±2 dB of the reproduced output level of said first signal current.

7. Perpendicular magnetic recording method according to claim 1, wherein the recording level of said second signal current is set at a level at which the cross-modulation distortion level is more than 20 dB below the reproduced output level of said first signal current.

8. Perpendicular magnetic recording method for recording a plurality of signal currents having different frequencies, comprising the steps of:
    setting the recording level of the signal current having the highest frequency among the plurality of signal currents to be a level greater than the current level at which a reproduced output level of said highest frequency signal current is maximized, said maximum of said reproduced output level being determined by varying said highest frequency signal current while holding the other signal currents constant;
    setting the recording levels of the other of said plurality of signal currents so as to minimize differences existing among the reproduced output levels of said other signal currents and the reproduced output level of said highest frequency signal current, while also attempting to minimize signal distortions;
    superimposing said plurality of signal currents with different frequencies;
    supplying said superimposed currents to a magnetic head; and
    magnetizing a magnetic recording medium with said magnetic head supplied with said superimposed currents, said medium having an axis of easy magnetization perpendicular to its surface.

9. Perpendicular magnetic recording method according to claim 8 wherein said current level of said highest frequency signal current is set at a value which is from 1 to 3 dB larger than the current level at which said reproduced output level of said highest frequency signal current attains a maximum.

10. Apparatus for recording a first signal current and a second signal current having a frequency lower than that of the first signal current comprising:
    means for setting the recording level of said first signal current to be a level greater than the current level at which a reproduced output level of said first signal current is maximized, said means determinig said maximum of said reproduced output level by varying said first input current while holding said second input current constant;
    means for setting the recording level of said second signal current to a level at which the reproduced output level of said second signal current is approximately equal to the reproduced output level of said first signal current;
    means for superimposing said first and second signal currents;
    a magnetic head;
    means for providing said superimposed currents to said magnetic head;
    a magnetic recording medium having an axis of easy magnetization perpendicular to its surface so that said signals provided to said magnetic head can be stored in said magnetic recording medium.

11. Apparatus as in claim 10 wherein said means for setting the recording level of said first signal current sets the current level corresponding to said first signal current at a value which is from 1 to 3 dB larger than the current level at which the reproduced output level of said first signal current attains a maximum.

12. Apparatus as in claim 10 wherein said medium includes a particulate perpendicular magnetic recording medium which is formed by coating magnetic powder on a substrate.

13. Apparatus as in claim 12 wherein said particulate medium has a magnetic layer which is a hexagonal system ferrite crystal.

14. Apparatus as in claim 13 wherein said crystal is a barium ferrite of Co-Ti substitution type.

15. Apparatus as in claim 10, wherein said means for setting the recording level of said second signal current includes means for setting said second signal current to a level at which the reproduced output level of said second signal current is within ±2 dB of the reproduced output level of said first signal current.

16. Apparatus as in claim 10, wherein said means for setting the recording level of said second signal current includes means for setting said second signal current to a level at which the cross-modulation distortion level is more than 20 dB below the reproduced output level of said first signal current.

17. Apparatus for recording a first signal and a second signal having a frequency lower than said first signal on a magnetic recording medium having an axis of easy magnetization perpendicular to its surface, said apparatus comprising:
    a magnetic head; and
    means for providing superimposed currents corresponding to said first and second signals to said magnetic head, the current level corresponding to said first signal being set by said providing means to a level greater than the current level at which a reproduced output level of said first signal current is maximized, said providing means determining said maximum of said reproduced output level by varying said first input current while holding said second input current constant, said providing means also setting the current level corresponding to said second signal to a level at which the reproduced output level of said second signal current is approximately equal to the reproduced output level of said first signal current.

18. Apparatus as in claim 17 wherein said providing means sets the current level corresponding to said first signal at a level which is from 1 to 3 dB larger than the current level at which the reproduced output level of said first signal attains a maximum.

19. Apparatus as in claim 17, wherein said providing means sets the current level corresponding to said second signal to a level at which the reproduced output level of said second signal current is within ±2 dB of the reproduced output level of said first signal current.

20. Apparatus as in claim 17, wherein said providing means sets the current level corresponding to said second signal to a level at which the cross-modulation distortion level is more than 20 dB below the reproduced output level of said first signal current.

* * * * *